(12) United States Patent
Gleiner et al.

(10) Patent No.: US 9,273,560 B2
(45) Date of Patent: Mar. 1, 2016

(54) GAS TURBINE ENGINE COMPONENT WITH MULTI-LOBED COOLING HOLE

(75) Inventors: Matthew S. Gleiner, Vernon, CT (US); Mark F. Zelesky, Bolton, CT (US); Atul Kohli, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 902 days.

(21) Appl. No.: 13/544,274

(22) Filed: Jul. 9, 2012

(65) Prior Publication Data
US 2013/0209269 A1    Aug. 15, 2013

Related U.S. Application Data

(60) Provisional application No. 61/599,354, filed on Feb. 15, 2012, provisional application No. 61/599,379, filed on Feb. 15, 2012, provisional application No. 61/599,381, filed on Feb. 15, 2012.

(51) Int. Cl.
*F01D 5/18* (2006.01)
*F01D 25/12* (2006.01)

(52) U.S. Cl.
CPC ............. *F01D 5/187* (2013.01); *F01D 5/186* (2013.01); *F01D 25/12* (2013.01); *F05D 2240/81* (2013.01); *F05D 2250/21* (2013.01); *F05D 2250/232* (2013.01); *F05D 2260/202* (2013.01);
(Continued)

(58) Field of Classification Search
CPC .......... F01D 5/186; F01D 5/187; F01D 9/06; F01D 25/12; F05D 2240/81; F05D 2260/202; F05D 2250/232; F05D 2250/21; Y10T 29/49234

USPC ................ 415/115; 416/96 R, 97 R, 193 A
See application file for complete search history.

(56) References Cited

U.S. PATENT DOCUMENTS

| 4,197,443 A | 4/1980 | Sidenstick |
| 4,347,037 A | 8/1982 | Corrigan |
| 4,529,358 A | 7/1985 | Papell |

(Continued)

FOREIGN PATENT DOCUMENTS

| EP | 1326007 A2 | 7/2003 |
| EP | 1609949 A1 | 12/2005 |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

(Continued)

*Primary Examiner* — Edward Look
*Assistant Examiner* — Danielle M Christensen
(74) *Attorney, Agent, or Firm* — Kinney & Lange, P.A.

(57) ABSTRACT

A component for a gas turbine engine includes a wall and a cooling hole extending through the wall. The wall has a first surface and a second surface. The cooling hole includes a metering section extending downstream from an inlet in the first surface of the wall and a diffusion section extending from the metering section to an outlet in the second surface of the wall. The diffusion section includes a first plurality of lobes diverging longitudinally and laterally from the metering section on a first side of a centerline axis of the cooling hole and a second plurality of lobes diverging longitudinally and laterally from the metering section on a second side of the centerline axis.

15 Claims, 14 Drawing Sheets

(52) U.S. Cl.
CPC .......... *Y02T 50/676* (2013.01); *Y10T 29/49234* (2015.01)

(56) References Cited

U.S. PATENT DOCUMENTS

| | | | |
|---|---|---|---|
| 4,622,821 A | 11/1986 | Madden | |
| 4,653,279 A | 3/1987 | Reynolds | |
| 4,653,983 A | 3/1987 | Vehr | |
| 4,672,727 A | 6/1987 | Field | |
| 4,684,323 A | 8/1987 | Field | |
| 4,700,544 A | 10/1987 | Fucci | |
| 4,738,588 A | 4/1988 | Field | |
| 5,062,768 A | 11/1991 | Marriage | |
| 5,096,379 A | 3/1992 | Stroud et al. | |
| 5,129,231 A | 7/1992 | Becker et al. | |
| 5,252,026 A | 10/1993 | Shepherd | |
| 5,326,224 A | 7/1994 | Lee et al. | |
| 5,358,374 A | 10/1994 | Correia et al. | |
| 5,382,133 A | 1/1995 | Moore et al. | |
| 5,418,345 A | 5/1995 | Adamski | |
| 5,419,681 A | 5/1995 | Lee | |
| 5,609,779 A | 3/1997 | Crow et al. | |
| 5,651,662 A | 7/1997 | Lee et al. | |
| 5,660,525 A | 8/1997 | Lee et al. | |
| 5,683,600 A | 11/1997 | Kelley et al. | |
| 5,779,437 A | 7/1998 | Abdel-Messeh et al. | |
| 5,813,836 A | 9/1998 | Starkweather | |
| 6,139,258 A | 10/2000 | Lang, III et al. | |
| 6,183,199 B1 | 2/2001 | Beeck et al. | |
| 6,241,468 B1 | 6/2001 | Lock et al. | |
| 6,243,948 B1 | 6/2001 | Lee et al. | |
| 6,287,075 B1 | 9/2001 | Kercher | |
| 6,307,175 B1 | 10/2001 | Blochlinger et al. | |
| 6,368,060 B1 | 4/2002 | Fehrenbach et al. | |
| 6,494,678 B1 | 12/2002 | Bunker | |
| 6,547,524 B2 | 4/2003 | Kohli et al. | |
| 6,572,335 B2 | 6/2003 | Kuwabara et al. | |
| 6,744,010 B1 | 6/2004 | Pepe et al. | |
| 6,944,580 B1 | 9/2005 | Blume et al. | |
| 6,973,419 B1 | 12/2005 | Fortin et al. | |
| 6,979,176 B2 | 12/2005 | Nakamata et al. | |
| 7,186,085 B2 | 3/2007 | Lee | |
| 7,273,351 B2 | 9/2007 | Kopmels | |
| 7,328,580 B2 | 2/2008 | Lee et al. | |
| 7,374,401 B2 | 5/2008 | Lee | |
| 7,578,653 B2 | 8/2009 | Klasing et al. | |
| 7,726,131 B2 | 6/2010 | Sze et al. | |
| 7,766,609 B1 | 8/2010 | Liang | |
| 7,887,294 B1 | 2/2011 | Liang | |
| 7,997,868 B1 | 8/2011 | Liang | |
| 8,038,399 B1 | 10/2011 | Liang | |
| 8,057,181 B1 | 11/2011 | Liang | |
| 8,066,484 B1 | 11/2011 | Liang | |
| 2001/0036401 A1 | 11/2001 | Harvey et al. | |
| 2002/0159888 A1 | 10/2002 | Rinck et al. | |
| 2005/0106020 A1 | 5/2005 | Bunker et al. | |
| 2005/0286998 A1 | 12/2005 | Lee et al. | |
| 2008/0003096 A1 | 1/2008 | Kohli et al. | |
| 2008/0057271 A1* | 3/2008 | Bunker | 428/137 |
| 2008/0145208 A1 | 6/2008 | Klasing et al. | |
| 2009/0013695 A1 | 1/2009 | Dierberger et al. | |
| 2009/0304499 A1 | 12/2009 | Strock et al. | |
| 2010/0040459 A1* | 2/2010 | Ohkita | 415/177 |
| 2010/0068032 A1 | 3/2010 | Liang | |
| 2010/0068067 A1 | 3/2010 | Liang | |
| 2010/0282721 A1 | 11/2010 | Bunker et al. | |
| 2011/0097191 A1 | 4/2011 | Bunker | |
| 2011/0185572 A1 | 8/2011 | Wei et al. | |
| 2011/0293423 A1 | 12/2011 | Bunker et al. | |
| 2012/0051941 A1 | 3/2012 | Bunker | |
| 2012/0167389 A1 | 7/2012 | Lacy et al. | |
| 2013/0115103 A1* | 5/2013 | Dutta et al. | 416/97 R |

OTHER PUBLICATIONS

The International Search Report mailed Jul. 18, 2013 for International Application No. PCT/US2013/026041.

* cited by examiner

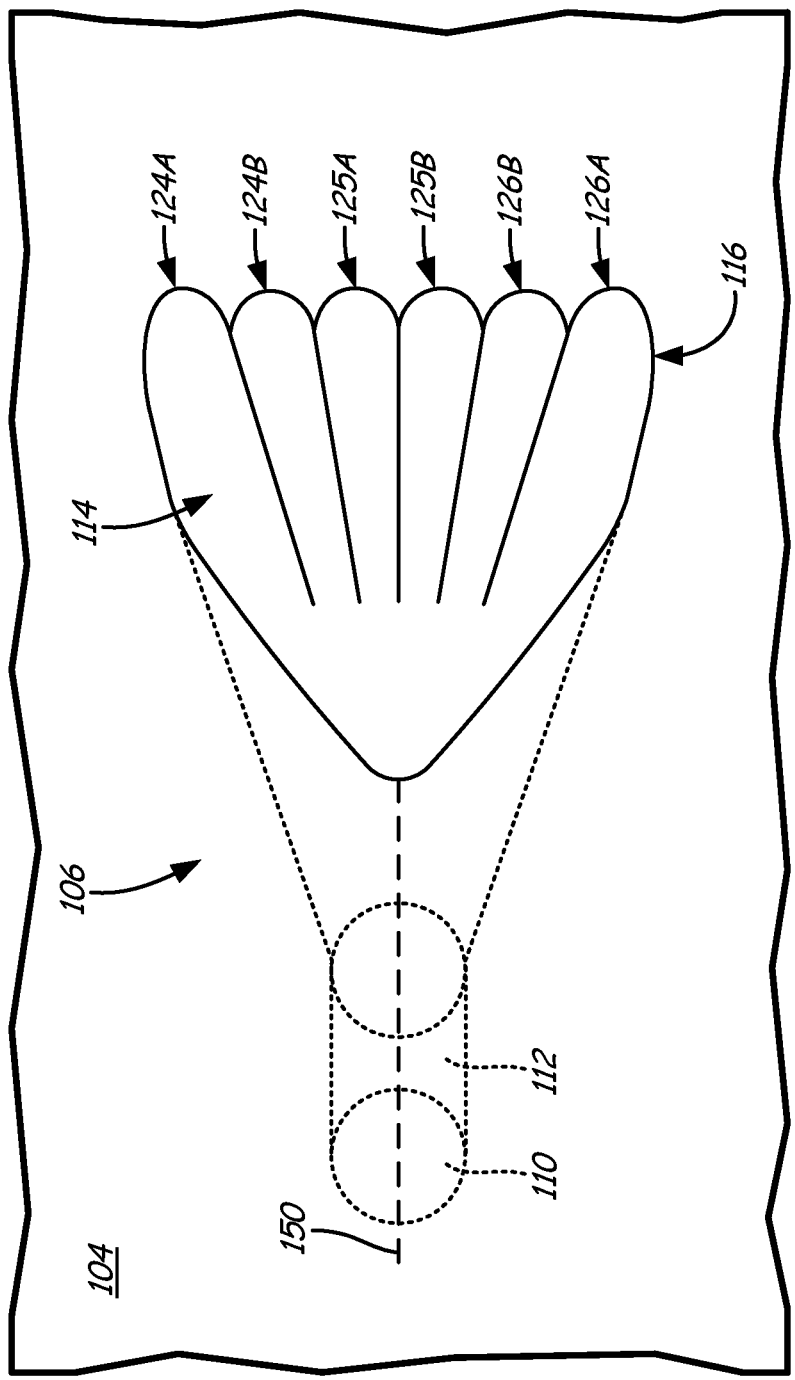

GAS TURBINE ENGINE COMPONENT WITH MULTI-LOBED COOLING HOLE

CROSS REFERENCE TO RELATED APPLICATION

This application claims priority to U.S. Provisional Application No. 61/599,354, filed on Feb. 15, 2012, and entitled "GAS TURBINE ENGINE COMPONENT WITH CUSPED, LOBED COOLING HOLE," U.S. Provisional Application No. 61/599,381, filed on Feb. 15, 2012 and entitled "TRI-LOBED COOLING HOLE AND METHOD OF MANUFACTURE," and U.S. Provisional Application No. 61/599,379, filed on Feb. 15, 2012 and entitled "MULTI-LOBED COOLING HOLE AND METHOD OF MANUFACTURE," the disclosures of which are incorporated by reference in their entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

According to the present invention, a component for a gas turbine engine includes a wall and a cooling hole extending through the wall. The wall has a first surface and a second surface. The cooling hole includes a metering section extending downstream from an inlet in the first surface of the wall and a diffusion section extending from the metering section to an outlet in the second surface of the wall. The diffusion section includes a first plurality of lobes diverging longitudinally and laterally from the metering section on a first side of a centerline axis of the cooling hole and a second plurality of lobes diverging longitudinally and laterally from the metering section on a second side of the centerline axis.

Another embodiment of the present invention includes a method for producing a cooling hole in a gas turbine engine wall having first and second wall surfaces. The method includes forming a metering section between the first wall surface and the second wall surface, forming a first plurality of lobes between the metering section and the second wall surface on a first side of a centerline axis; and forming a second plurality of lobes between the metering section and the second wall surface on a second side of the centerline axis. The metering section meters a flow of fluid through the cooling hole. The first and second plurality of lobes diverge longitudinally and laterally from the metering section.

BRIEF DESCRIPTION OF THE DRAWINGS

FIG. 12 is a top view of a multi-lobed cooling hole having 6 lobes.

DETAILED DESCRIPTION

Figure 1:
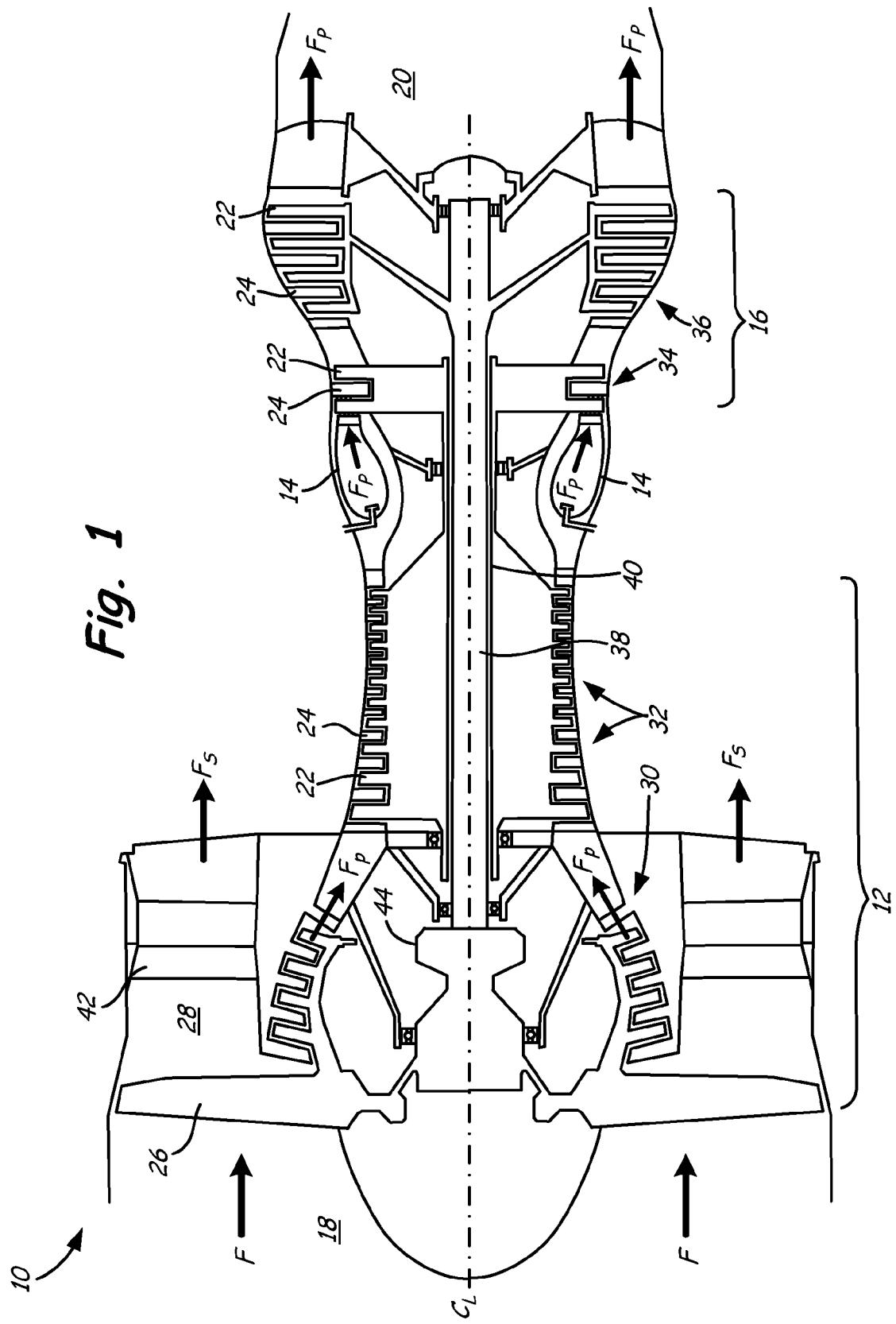
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
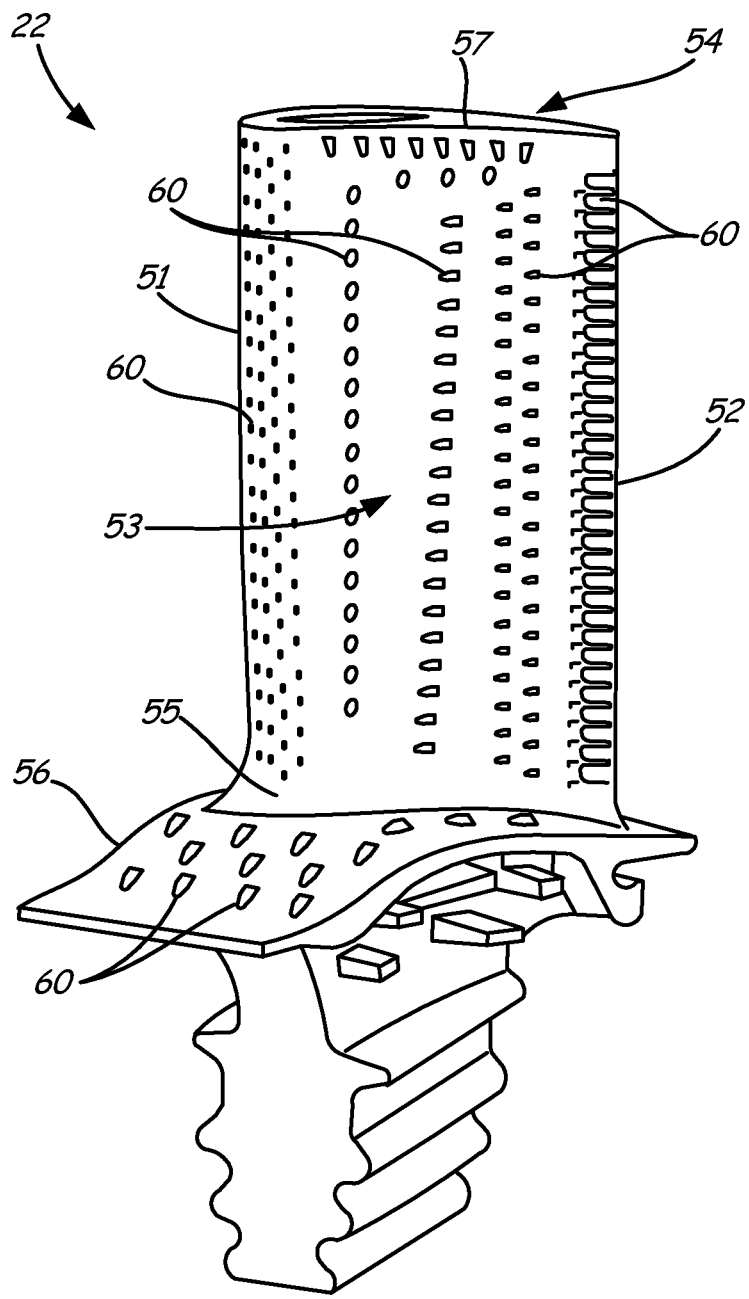
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
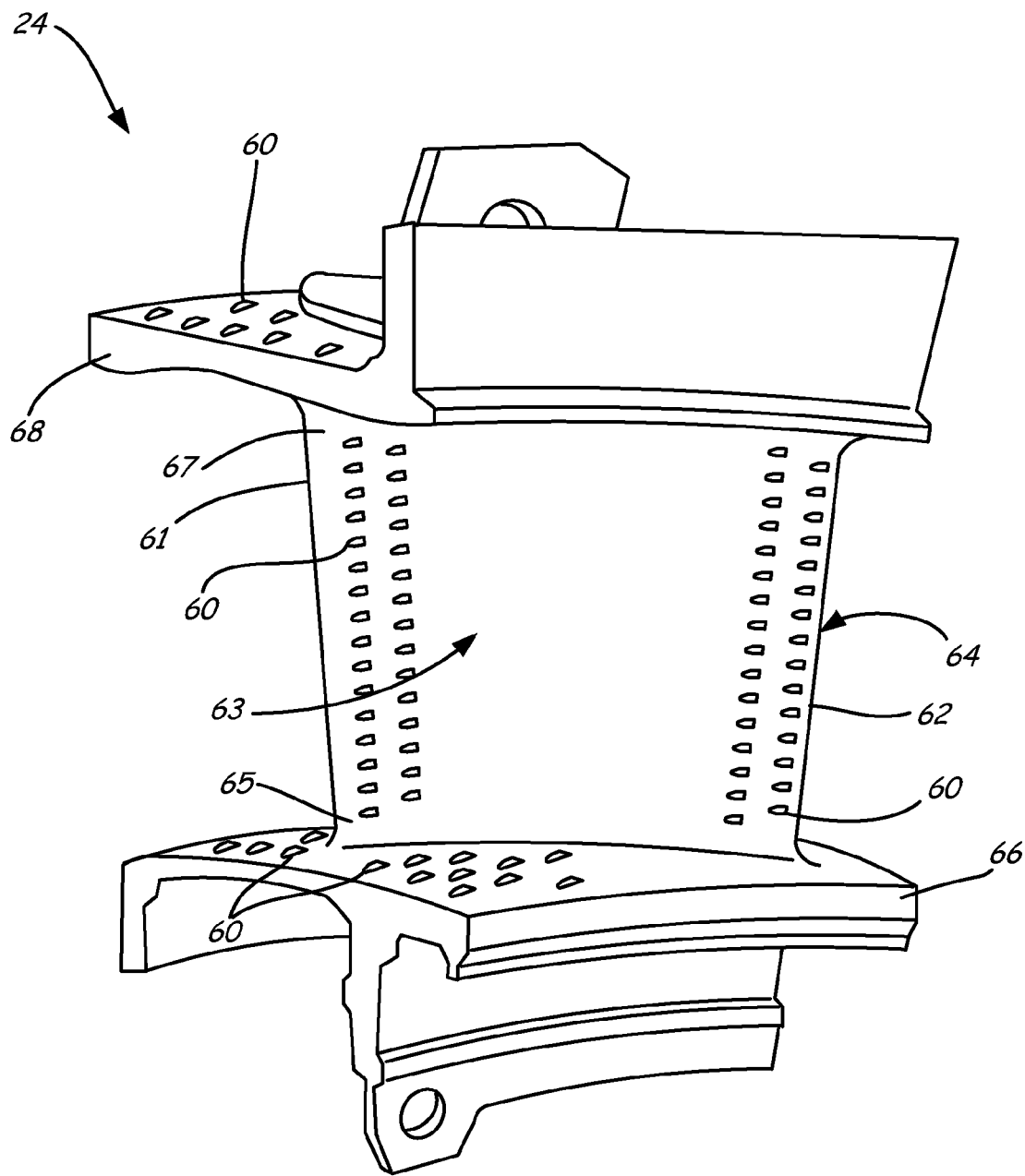
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot surfaces of airfoils 22 and 24, and other gas turbine engine components, so that less flow is needed for cooling and efficiency is maintained or increased.

The multi-lobed cooling holes described herein provide a cooling solution that offers improved film cooling coverage and eliminates or reduces the problems associated with conventional diffusion film cooling holes, such as flow separation and blow off. Multi-lobed cooling holes provide improved film effectiveness and reduce the likelihood of film separation so that they work as intended at high blowing ratios and reduce detrimental effects such as kidney vortices.

Figure 3:
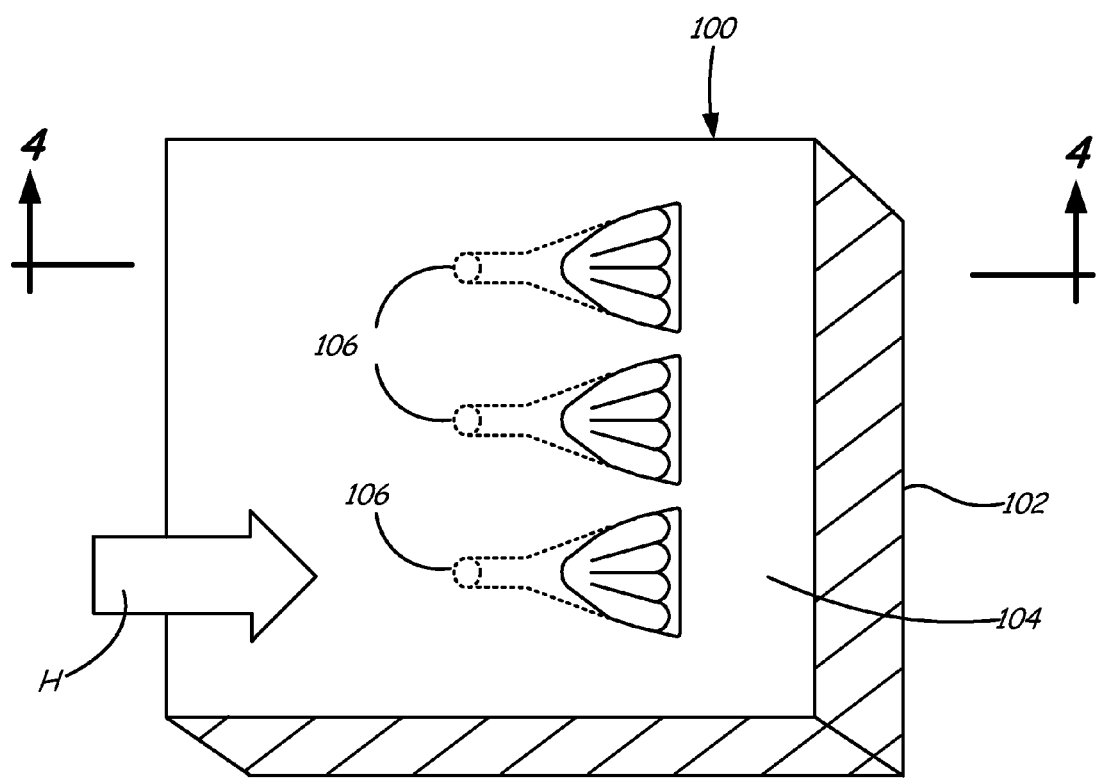
FIG. 3 is a top view of a wall of the gas turbine engine having multi-lobed cooling holes.

Gas turbine engine components exposed to hot gas flow typically include a wall in which film cooling may be utilized. FIG. 3 illustrates a view of a wall of a gas turbine engine component having multi-lobed film cooling holes. Wall 100 includes inner wall surface (first surface) 102 and outer wall surface (second surface) 104. As described in greater detail below, wall 100 is primarily metallic and outer wall surface 104 can include a thermal barrier coating. Multi-lobed film cooling holes 106 are oriented so that their inlets are positioned on the inner wall surface 102 and their outlets are positioned on outer wall surface 104. During gas turbine engine operation, outer wall surface 104 is in proximity to high temperature gases (e.g., combustion gases, hot air). Cooling air is delivered inside wall 100 where it exits the interior of the component through cooling holes 106 and forms a cooling film on outer wall surface 104. As shown in FIG. 3, cooling holes 106 have four lobes in the diffusing section of the cooling hole.

As described below in greater detail, cooling air flows out of cooling holes 106, with cooling air flowing through each of the lobes in the diffusing section. Cooling holes 106 can be arranged in a row on wall 100 as shown in FIG. 3 and positioned axially so that the cooling air flows in substantially the same direction longitudinally as the high temperature gases flowing past wall 100. In this embodiment, cooling air passing through cooling holes 106 exits cooling holes traveling in substantially the same direction as the high temperature gases flowing along outer wall surface 104 (represented by arrow H). As shown in FIG. 3, the row of cooling holes 106 is substantially perpendicular to the direction of flow H. In alternate embodiments, the orientation of cooling holes 106 can be arranged on outer wall surface 104 so that the flow of cooling air is perpendicular to the high temperature gas flow (i.e. cooling air exits cooling holes 106 radially) or at an angle between parallel and perpendicular. Cooling holes 106 can also be provided in other formations on wall 100, such as a staggered formation. In another embodiment, each of the lobes of cooling hole 106 may be individually contoured and oriented to match fluid flow around cooling hole 106. Cooling holes 106 can be located on a variety of components that require cooling. Suitable components include, but are not limited to, turbine vanes and blades, combustors, blade outer air seals, augmentors, etc. Cooling holes 106 can be located on the pressure side or suction side of vanes and blades. Cooling holes 106 can also be located on the blade tip or blade or vane platforms.

Figure 4:
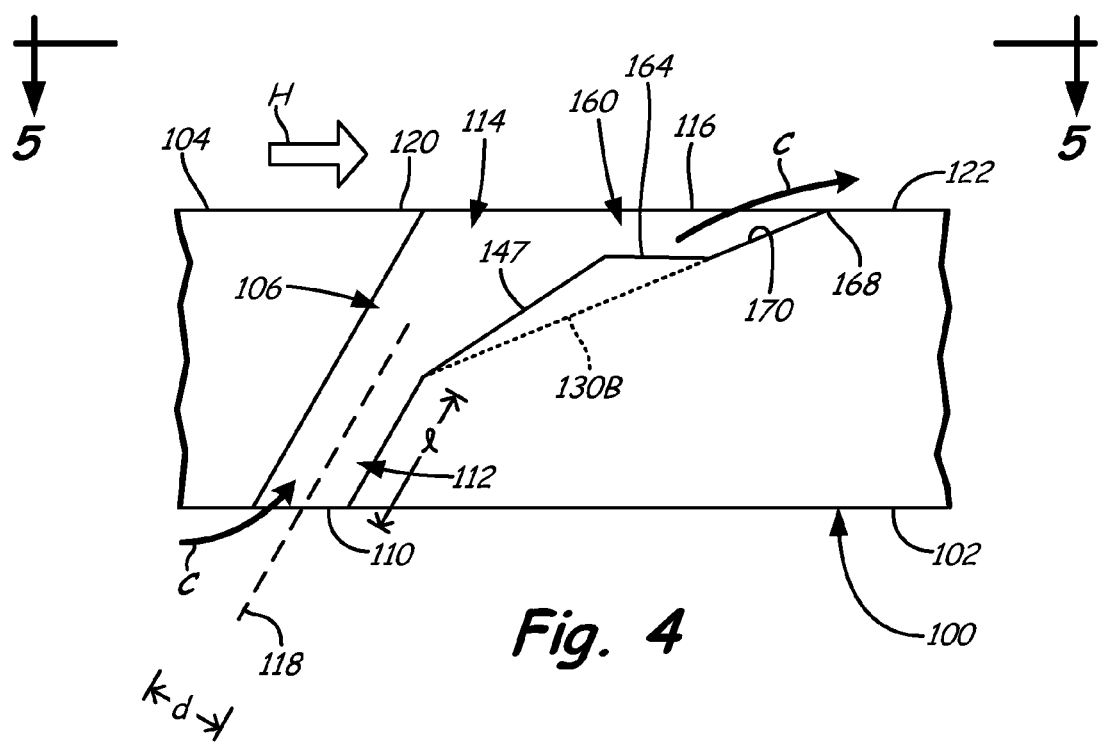
FIG. 4 is a sectional view of one embodiment of the multi-lobed cooling hole of FIG. 3 taken along the line 4-4.
Figure 5:
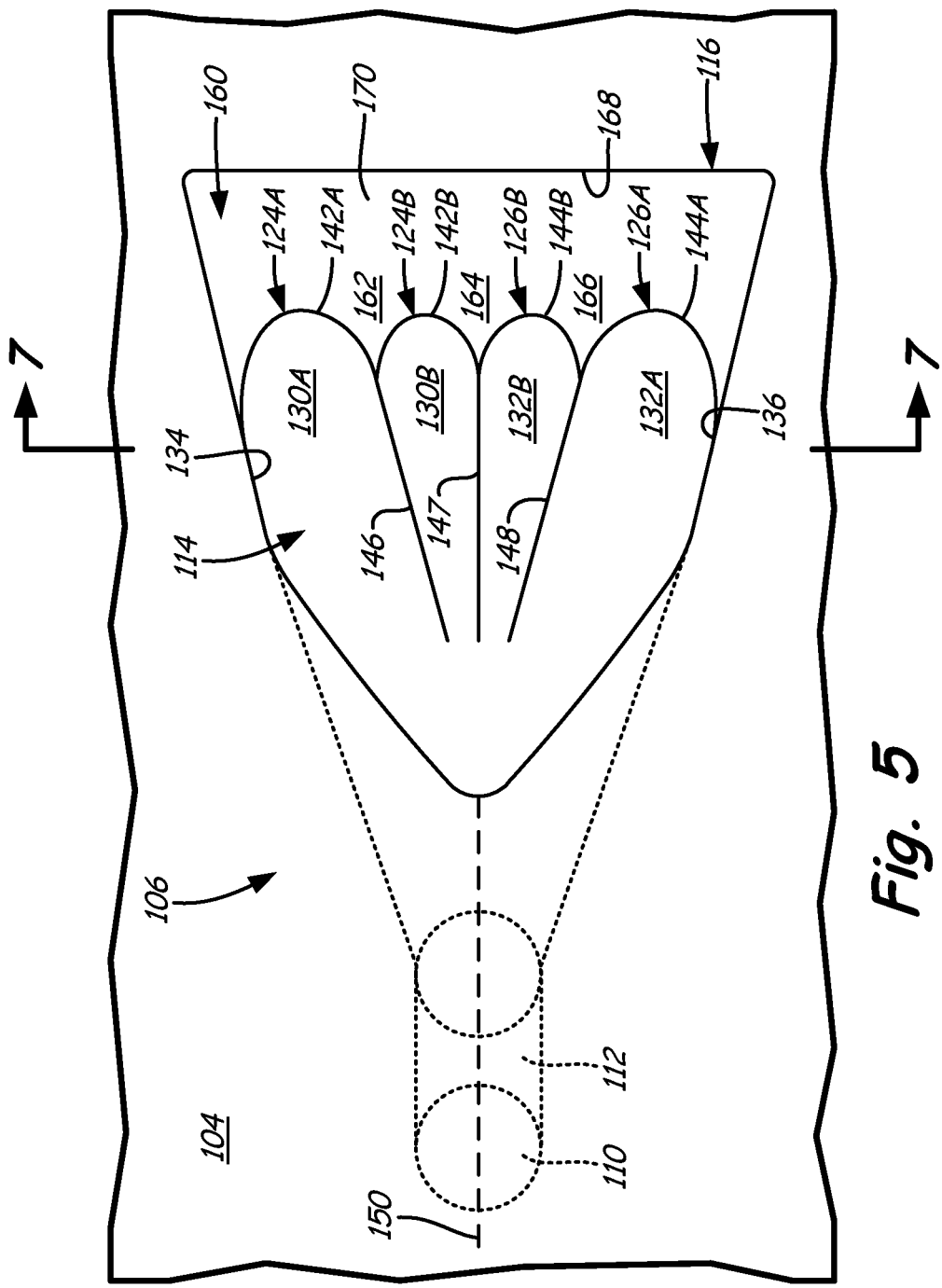
FIG. 5 is a view of one of the multi-lobed cooling holes of FIG. 3.

FIGS. 4 and 5 illustrate one embodiment of cooling hole 106 in greater detail. FIG. 4 illustrates a sectional view of multi-lobed film cooling hole 106 of FIG. 3 taken along the line 4-4 of FIG. 3. FIG. 5 illustrates a more detailed view of cooling hole 106 of FIG. 3. Cooling hole 106 includes inlet 110, metering section 112, diffusing section 114 and outlet 116. Inlet 110 is an opening located on inner wall surface 102. Cooling air C enters cooling hole 106 through inlet 110 and passes through metering section 112 and diffusing section 114 before exiting cooling hole 106 at outlet 116 along outer wall surface 104.

Metering section 112 is adjacent to and downstream from inlet 110 and controls (meters) the flow of cooling air through cooling hole 106. In exemplary embodiments, metering section 112 has a substantially constant flow area from inlet 110 to diffusing section 114. Metering section 112 can have circular, oblong (oval or elliptical) or racetrack (oval with two parallel sides having straight portions) shaped axial cross sections. In FIGS. 4 and 5, metering section 112 has a circular cross section. Circular metering sections 112 have a length l and diameter d. In exemplary embodiments, inlet 110 and metering section 112 have the same diameter d. In some embodiments, circular metering section 112 has a length l according to the relationship: $d \leq l \leq 3d$. That is, the length of metering section 112 is between one and three times its diameter. The length of metering section 112 can exceed 3d, reaching upwards of 30d. In alternate embodiments, metering section 112 has a non-circular cross section such as an oblong or racetrack-shape, with metering section 112 having a length l and hydraulic diameter $d_h$. In some embodiments, metering section 112 has a length l according to the relationship: $d_h \leq l \leq 3d_h$. That is, the length of metering section 112 is between one and three times its hydraulic diameter. The length of metering section 112 can exceed $3d_h$, reaching upwards of $30d_h$. In exemplary embodiments, metering section 112 is inclined with respect to wall 100 as illustrated in FIG. 4 (i.e. metering section 112 is not perpendicular to wall 100). Metering section 112 has a longitudinal axis represented by numeral 118. Longitudinal axis 118 represents the angle of metering section 112 between inner wall surface 102 and outer wall surface 104.

Diffusing section 114 is adjacent to and downstream from metering section 112. Cooling air C diffuses within diffusing section 114 before exiting cooling hole 106 along outer wall surface 104. Outer wall surface 104 includes upstream end 120 (upstream of cooling hole 106) and downstream end 122 (downstream from cooling hole 106). Diffusing section 114 opens along outer wall surface 104 between upstream end 120 and downstream end 122. As shown in FIG. 4, cooling air C diffuses away from longitudinal axis 118 in diffusing section 114 as it flows towards outlet 116.

As shown best in FIG. 5, diffusing section 114 includes four channel-like lobes 124A, 124B, 126A, and 126B. Each lobe 124A, 124B, 126A, and 126B has a bottom surface (bottom surfaces 130A, 130B, 132A and 132B, respectively). Lobes 124A and 126A have outer side walls 134 and 136, respectively. Each lobe 124A, 124B, 126A, and 126B also has a trailing edge (trailing edges 142A, 142B, 144A, and 144B, respectively). Lobes 124A and 124B meet along ridge 146, lobes 124B and 126B meet along ridge 147, and lobes 126B and 126A meet along ridge 148. FIG. 4 illustrates a sectional view taken through the center of cooling hole 106 (along centerline axis 150 of FIG. 5) and shows ridge 147 between lobes 124B and 126B. In this embodiment, bottom surfaces 130A, 130B, 132A and 132B are inclined at the same angle (represented by bottom surface 130B in FIG. 4). In other embodiments, bottom surfaces 130A, 130B, 132A and 132B can be inclined at different angles.

Lobes 124A, 124B, 126A, and 126B diverge longitudinally and laterally from metering section 112. FIG. 4 best illustrates the longitudinal divergence (from longitudinal axis 118), while FIG. 5 best illustrates the lateral divergence (from centerline axis 150). Centerline axis 150 extends through the center of metering section 112. As shown in FIG. 5, lobes 124A and 124B laterally diverge upwards from centerline axis 150 and lobes 126A and 126B laterally diverge downwards from centerline axis 150.

Cooling air C leaving metering section 112 and entering diffusing section 114 diffuses into lobes 124A, 124B, 126A, and 126B, causing the cooling air to spread laterally within diffusing section 114. Side wall 134, ridge 146 and bottom surface 130A direct cooling air C through lobe 124A. Ridges 146 and 147 and bottom surface 130B direct cooling air C through lobe 124B. Ridges 147 and 148 and bottom surface 132B direct cooling air C through lobe 126B. Side wall 136, ridge 148 and bottom surface 132A direct cooling air C through lobe 126A. Cooling air C flowing through diffusing section 114 diverges longitudinally from longitudinal axis 118 as it "attaches" to bottom surfaces 130A, 130B, 132A, and 132B of respective lobes 124A, 124B, 126A, and 126B.

Ridges 146, 147, and 148 aid in directing cooling air C into lobes 124A, 124B, 126A, and 126B. Ridges 146, 147, and 148 are generally inverted V-shaped portions where adjacent lobes meet. Ridges 146, 147, and 148 can form a sharp edge between the lobes (edges of adjacent lobes meet at a point as viewed in a 2-dimensional sectional view, such as FIGS. 7 and 10). Alternatively, ridges 146, 147, and 148 can be rounded or have other geometric shapes. Ridges 146, 147, and 148 can form a straight line between adjacent lobes as shown in FIG. 5. Alternatively, ridges 146, 147, and 148 can be curved. Ridges 146, 147, and 148 can also curve with respect to bottom surfaces 130A, 130B, 132A, and 132B of lobes 124A, 124B, 126A, and 126B.

As cooling air C exits metering section 112 and enters diffusing section 114, cooling air C encounters ridges 146, 147, and 148. Ridges 146, 147, and 148 extend farther towards outer wall surface 104 than lobes 124A, 124B, 126A, and 126B as shown in FIG. 4. As a result, ridges 146, 147, and 148 project towards outer wall surface 104 and serve to guide the flow of cooling air C into lobes 124A, 124B, 126A, and 126B. Ridge 146 divides the flow of cooling air C between lobes 124A and 124B, causing cooling air C flowing into lobes 124A and 124B to diverge laterally to correspond to the shape of lobes 124A and 124B. Ridge 147 divides the flow of cooling air C between lobes 124B and 126B, causing cooling air C flowing into lobes 124B and 126B to diverge laterally to correspond to the shape of lobes 124B and 126B. Ridge 148 divides the flow of cooling air C between lobes 126A and 126B, causing cooling air C flowing into lobes 126A and 126B to diverge laterally to correspond to the shape of lobes 126A and 126B. Ridges 146, 147, and 148 do not necessarily divide the flow of cooling air C between adjacent lobes equally.

In some embodiments, bottom surfaces 130A, 130B, 132A, and 132B of lobes 124A, 124B, 126A, and 126B, respectively, include a curved portion. As shown in FIGS. 4 and 5, lobes 124A, 124B, 126A, and 126B can be curved. Lobe 124A includes a curved surface at side wall 134 and a curved bottom surface 130A. Lobe 126A includes a curved surface at side wall 136 and a curved bottom surface 132A. Lobe 124B and 126B include curved bottom surfaces 130B and 132B. In this embodiment, bottom surfaces 130A, 130B, 132A and 132B are concave. Curved surfaces at side walls 134 and 136 and curved bottom surfaces 130A, 130B, 132A, and 132B aid in improving the attachment of cooling air C to lobes 124A, 124B, 126A, and 126B. By improving cooling flow attachment to the lobes, cooling air C can spread laterally without separation to improve cooling film formation and cooling film effectiveness.

In one embodiment, lobes 124A, 124B, 126A, and/or 126B can each have a continuous radius of curvature, such as from ridge 146 to side wall 134 of lobe 124A. In an alternative embodiment, bottom surfaces 130A, 130B, 132A, and/or 132B of lobes 124A, 124B, 126A, and 126B, respectively, can also include a substantially planar portion. Additionally, lobes 124A, 124B, 126A, and 126B can have other geometric shapes between respective side walls 134 and 136 and ridges 146, 147, and 148.

Figure 7:
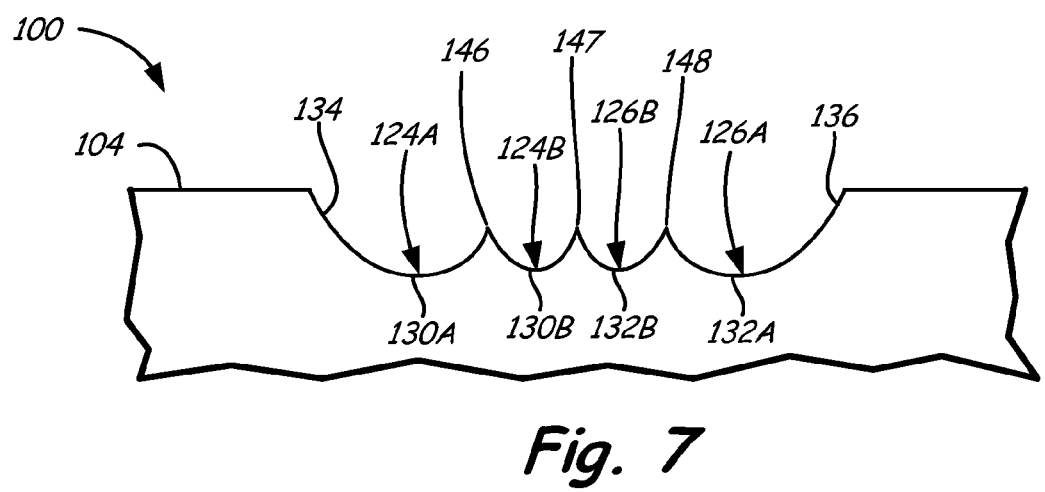
FIG. 7 is a cross-sectional view of the cooling hole of FIG. 5 taken along the line 7-7.

FIG. 7 is a cross-sectional view of diffusing section 114 taken along the line 7-7 of FIG. 5. FIG. 7 illustrates ridges 146, 147 and 148, bottom surfaces 130A, 130B, 132A and 132B, and side walls 136 and 138. In the illustrated embodiment, ridges 146, 147, and 148 extend to a height lower than outer wall surface 104.

As illustrated best in FIGS. 5 and 7, cooling hole 106 includes a first plurality of lobes (lobes 130A and 130B) on one side of centerline axis 150 and a second plurality of lobes (lobes 132A and 132B) on an opposite side of centerline axis 150. Lobes 130B and 132B are substantially proximate centerline axis 150, while lobes 130A and 132A are further from centerline axis 150. In an alternative embodiment, cooling hole 106 can have a first plurality of lobes with a number greater than two lobes (such as three lobes) on one side of centerline axis 150 and a second plurality of lobes with a number greater than two lobes (such as three lobes) on an other side of centerline axis 150. The number of lobes on each side of centerline axis 150 can be the same. In an alternative embodiment, the number of lobes on each side of centerline axis 150 can be different. In an alternative embodiment, centerline axis 150 can be aligned or not aligned with one of ridges 146, 147, and 148.

Diffusing section 114 may include transition region 160. Transition region 160 separates lobes 124A, 124B, 126A, and 126B from outlet 116. In some embodiments, transition region 160 also includes portions that are located between adjacent lobes, as shown in FIG. 5. For example, portion 162 of transition region 160 is located between lobe 124A and lobe 124B. Portion 164 of transition region 160 is located between lobe 124B and lobe 126B. Portion 166 of transition region 160 is located between lobe 126B and lobe 126A. End 168 of transition region 160 is adjacent outlet 116, where outlet 116 meets outer wall surface 104. Portions 162, 164, and 166 can extend towards metering section 112 to varying degrees. In the embodiment shown in FIGS. 4 and 5, portions 162, 164, and 166 are present only near the respective trailing edges 142A, 142B, 144A, and 144B of lobes 124A, 124B, 126A, and 126B. The location of end 168 of transition region 160 relative to trailing edges 142A, 142B, 144A, and 144B can also vary. In the embodiment shown in FIG. 5, end 168 is spaced from trailing edges 142A, 142B, 144A, and 144B. In this embodiment, trailing edges 142A, 142B, 144A, and 144B and hence, lobes 124A, 124B, 126A, and 126B, do not extend to outlet 116 or outer wall surface 104, but terminate before reaching transition region 160. Instead, portion 170 of transition region 160 is located between trailing edges 142A, 142B, 144A, and 144B and outlet 116. In some embodiments, transition region 160 spans from trailing edge 142A to trailing edge 144A as shown in FIG. 5. Additionally, in some embodiments, end 168 of transition region 160 is straight as shown in FIG. 5.

Figure 6:
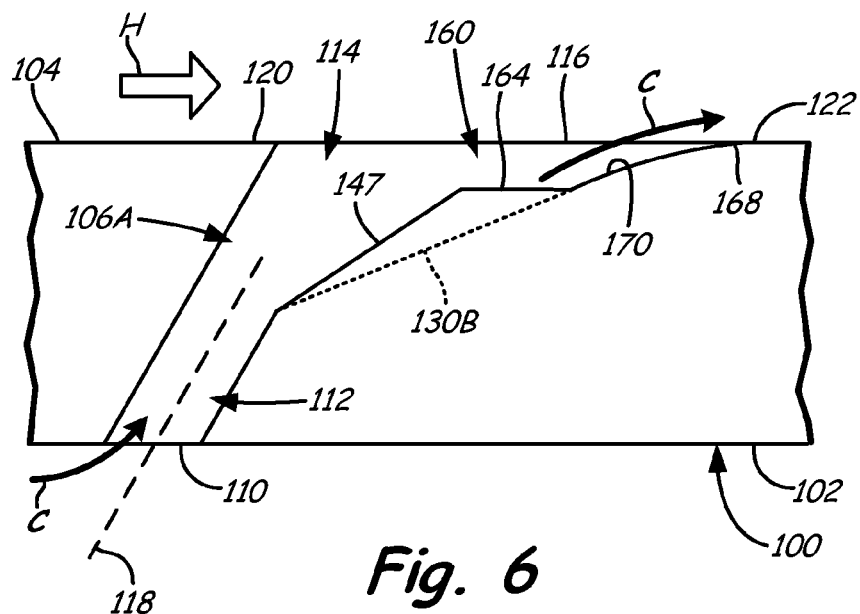
FIG. 6 is a sectional view of another embodiment of a multi-lobed cooling hole.

Transition region 160 (and portions 162, 164, 168, and 170) can take various shapes and have different configurations depending on the location and desired flow profile of cooling hole 106. The bottom surface of transition region 160 can be flat or curved. A curved (longitudinally convex) bottom surface of transition region 160 can facilitate improved flow attachment due to the Coanda effect. FIG. 6 illustrates a sectional view of one embodiment of multi-lobed cooling hole 106A in which portion 170 of transition region 160A is longitudinally convex.

Adding transition region 160 to diffusing section 114 can improve the thermo-mechanical fatigue tolerance of multi-lobed cooling hole 106. Without transition region 160, the trailing edge of cooling hole 106 (where outlet 116 and outer wall surface 104 meet) could include sharp edges or corners at the trailing edge of ridges 146, 147, and 148 and at trailing edges 142A, 142B, 144A, and 144B of lobes 124A, 124B, 126A, and 126B. These sharp edges and corners can be highly susceptible to thermo-mechanical fatigue. Over time, cracks can develop in these areas due to the temperature cycling that occurs during operation. These cracks can further reduce cooling effectiveness and performance and will eventually lead to failure, requiring replacement or repair of the affected component. Replacing and repairing components is costly both in terms of materials and in aircraft downtime. By incorporating transition region 160 into diffusing section 114, the previously sharp edges and corners can be blended into smoother transitions that are less susceptible to thermo-mechanical fatigue. Additionally, smoother transitions near ridges 146, 147, and 148 and trailing edges 142A, 142B, 144A, and 144B can reduce the likelihood that cooling air C will "jet off" instead of forming a cooling film along outer wall surface 104.

Figure 8:
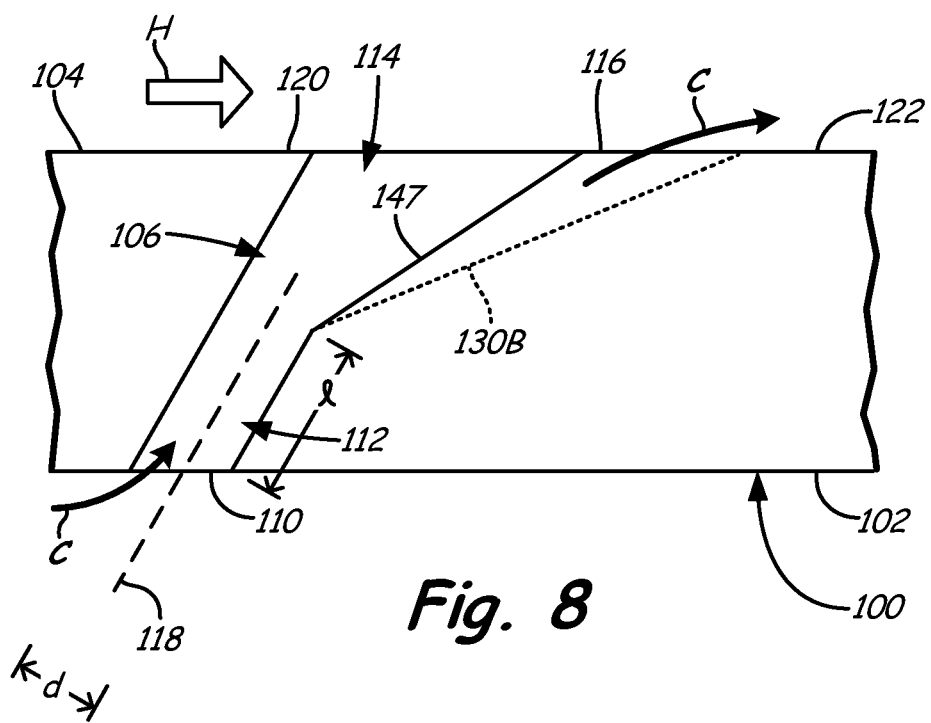
FIG. 8 is a sectional view of another embodiment of a multi-lobed cooling hole.
Figure 9:
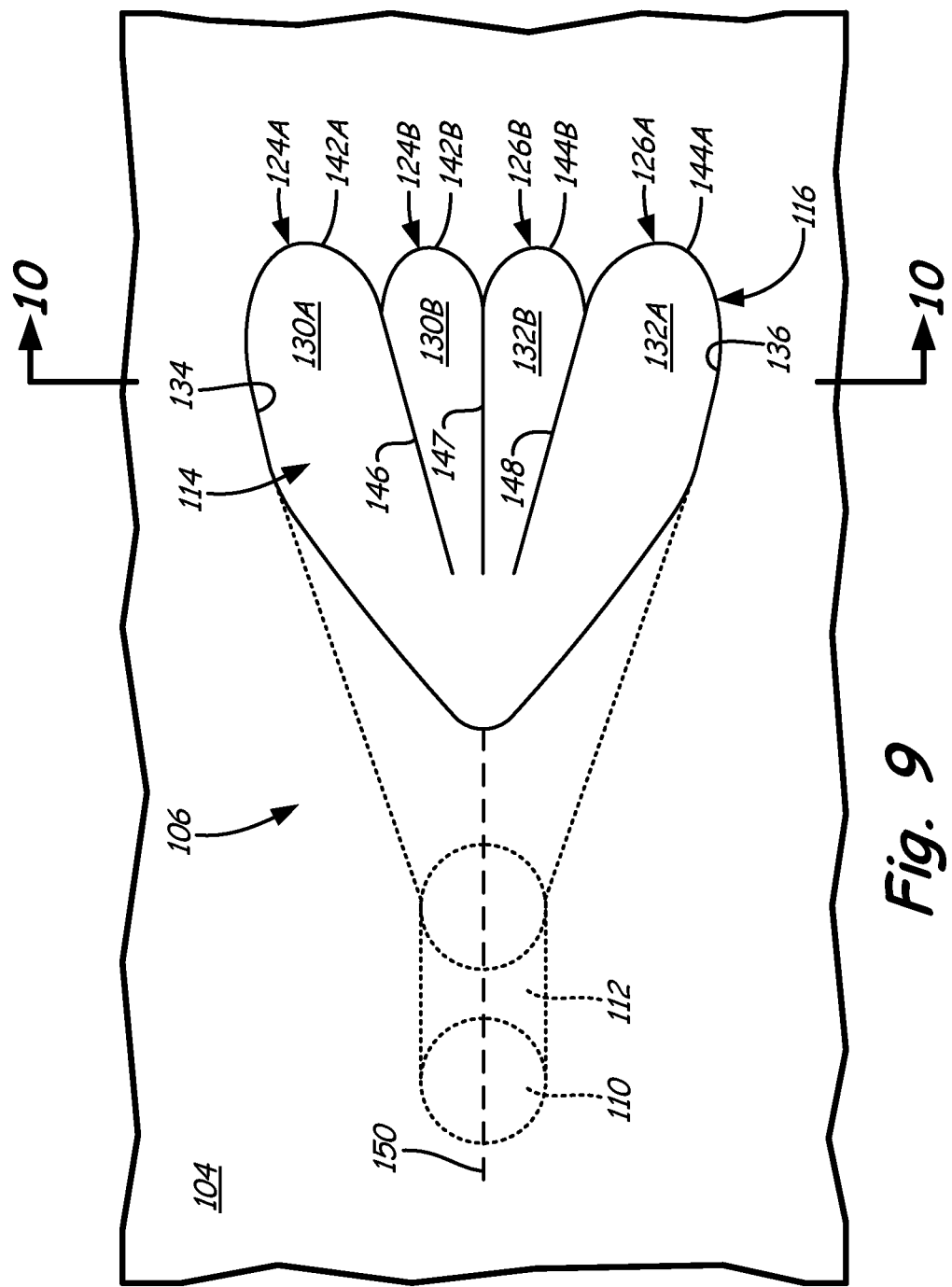
FIG. 9 is a top view of the cooling hole of FIG. 8.
Figure 10:
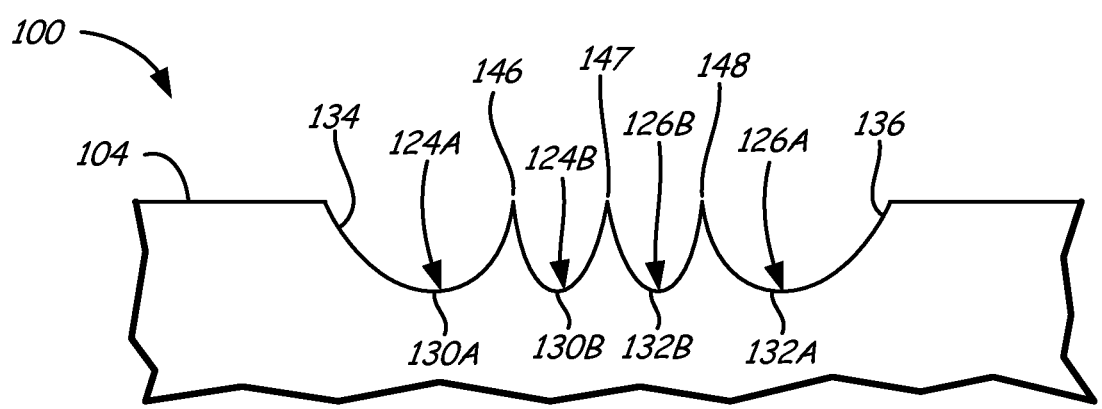
FIG. 10 is a cross-sectional view of the cooling hole of FIG. 9 taken along the line 10-10.

FIGS. 8, 9, and 10 illustrate an embodiment of cooling hole 106 that does not include transition region 160 (as illustrated in FIGS. 4 and 5). Lobes 124A, 124B, 126A, and 126B extend all the way to outer wall surface 104 such that edges 142A, 142B, 144A, and 144B are at outlet 116 on outer wall surface 104. Ridges 146, 147, and 148 also extend to outlet 116. As illustrated in FIG. 10, ridges 146, 147, and 148 extend to a height substantially equal to that of outer wall surface 104. The embodiment illustrated in FIGS. 8, 9, and 10 can be easier and less expensive to manufacture than embodiments containing transition region 160 (such as those described above). Thus, the embodiment illustrated in FIGS. 8, 9, and 10, and other embodiments that do not include a transition region, can be beneficial in applications where the benefits of transition region are either less important or unnecessary.

Figure 11:
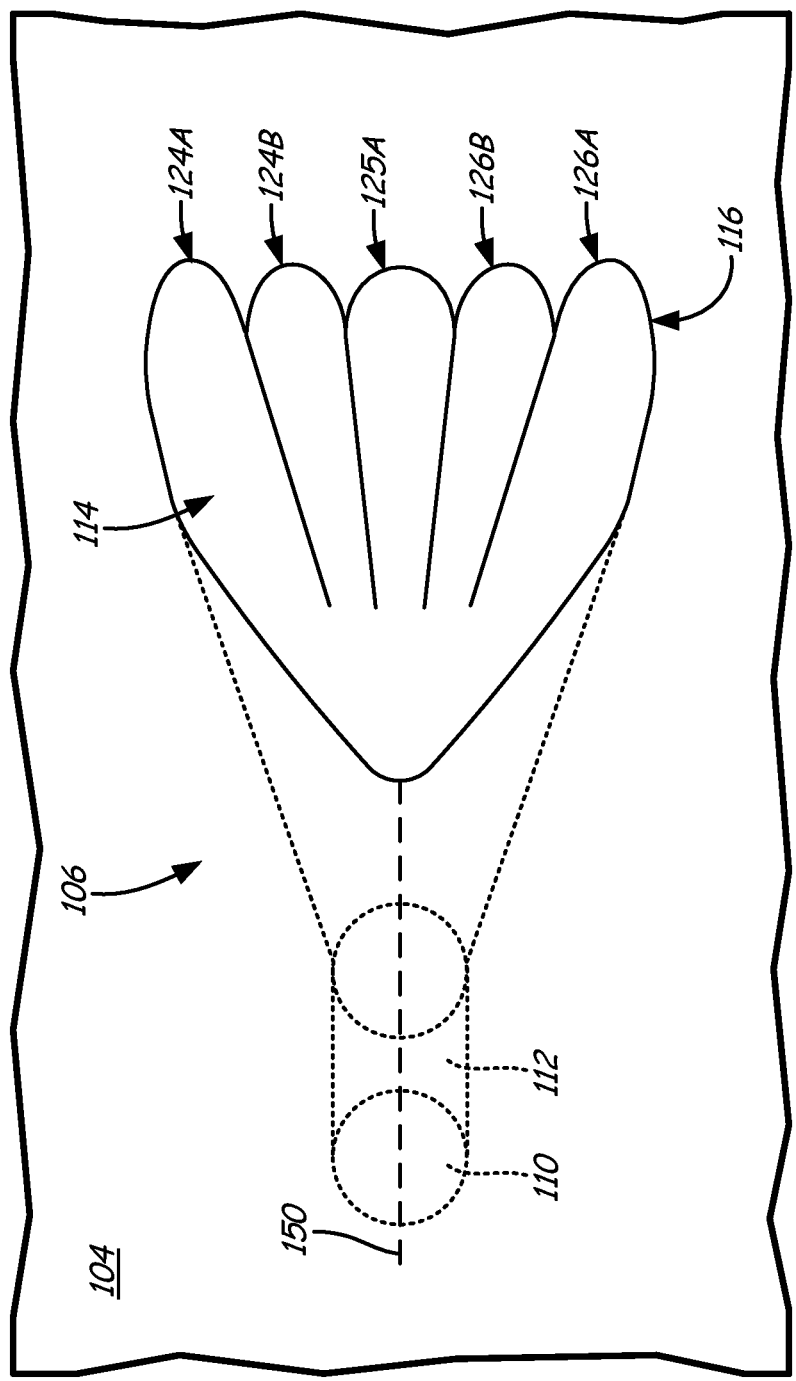
FIG. 11 is a top view of a multi-lobed cooling hole having 5 lobes.

FIG. 11 is a top view of cooling hole 106 having 5 lobes (lobes 124A, 124B, 125A, 126A, and 126B). Like the embodiments illustrated and described with respect to FIGS. 3-10, the embodiment of cooling hole 106 illustrated in FIG. 11 has lobes 124A and 124B on a first side of centerline axis 150 and has lobes 126A and 126B on a second side of centerline axis 150. The embodiment of cooling hole 106 illustrated in FIG. 11 also includes lobe 125A, positioned between lobes 124B and 126B. Thus, lobe 125A is effectively a center lobe. In the illustrated embodiment, lobes 124A, 124B, 125A, 126A, and 126B are aligned substantially symmetrically about centerline axis 150. In an alternative embodiment, lobes 124A, 124B, 125A, 126A, and 126B can be aligned asymmetrically about centerline axis 150. In alternative embodiments, cooling hole 106 can have an odd number of lobes greater than 5, such as 7 or 9.

FIG. 12 is a top view of cooling hole 106 having 6 lobes (lobes 124A, 124B, 125A, 125B, 126A, and 126B). Like the embodiments illustrated and described with respect to FIGS. 3-11, the embodiment of cooling hole 106 illustrated in FIG. 11 has lobes 124A and 124B on a first side of centerline axis 150 and has lobes 126A and 126B on a second side of centerline axis 150. The embodiment of cooling hole 106 illustrated in FIG. 11 also includes lobe 125A and 125B, positioned between lobes 124B and 126B. In the illustrated embodiment, lobes 124A, 124B, 125A, 125B, 126A, and 126B are aligned substantially symmetrically about centerline axis 150. In an alternative embodiment, lobes 124A, 124B, 125A, 125B, 126A, and 126B can be aligned asymmetrically about centerline axis 150. In alternative embodiments, cooling hole 106 can have an even number of lobes greater than 6, such as 8 or 10.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering section, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering section, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

Figure 13A:
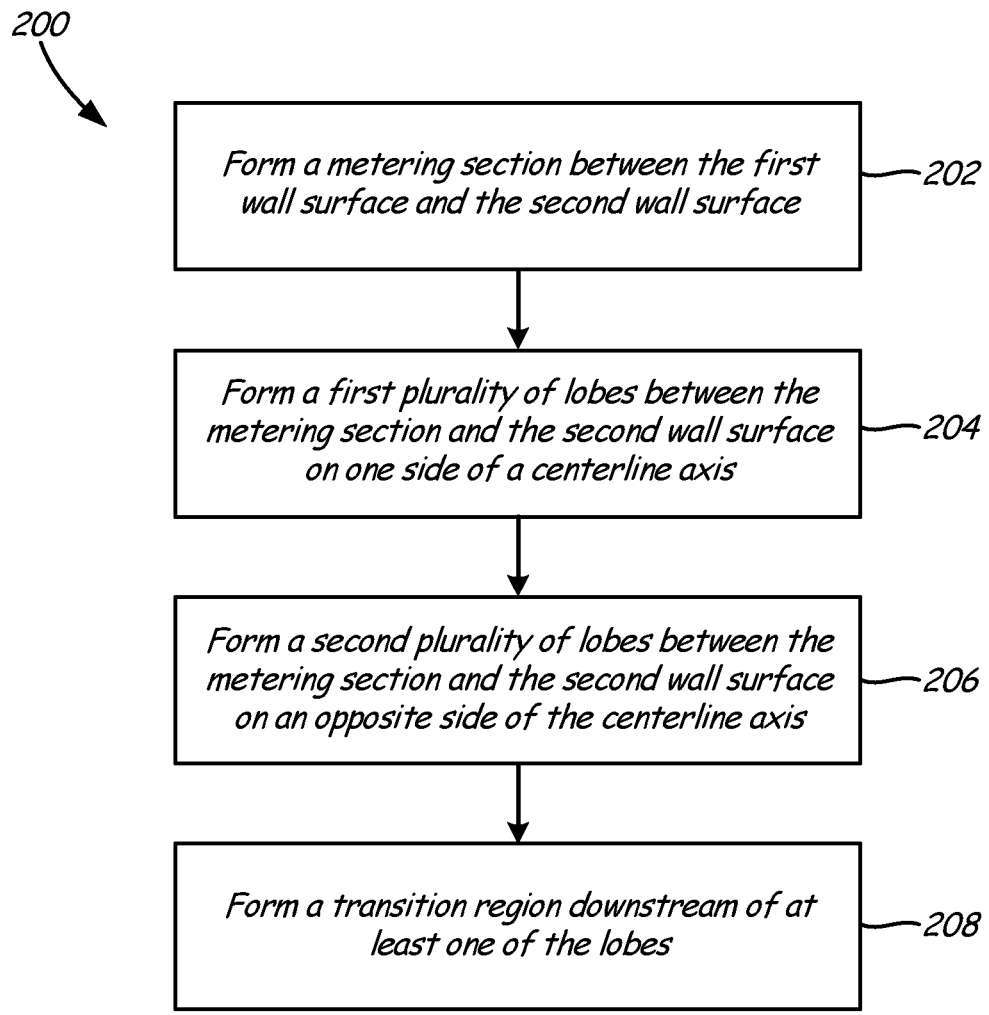
FIG. 13A is a simplified flow diagram illustrating one embodiment of a method for producing a multi-lobed cooling hole in a gas turbine engine wall.

FIG. 13A is a simplified flow diagram illustrating one embodiment of a method for producing a multi-lobed cooling hole in a gas turbine engine wall having first and second wall surfaces. Method 200 includes forming a metering section between the first and second surfaces (step 202), forming a first plurality of lobes between the metering section and the second wall surface on one side of a centerline axis (step 204), forming a second plurality of lobes between the metering section and the second wall surface on an opposite side of the centerline axis (step 206), and forming a transition region downstream of at least one of the lobes (step 208) for embodiments that include a transition region. Metering section 112 is formed in step 202 by one or more of the techniques: casting, machining or drilling. The technique(s) chosen is/are typically determined based on performance, reproducibility and cost. In embodiments where step 202 occurs prior to steps 204, 206, and 208, inlet 110 and portions of diffusing section 114 and outlet 116 can also be formed during formation of metering section 112. Diffusing section 114 is formed in steps 204, 206, and 208 by one or more of the casting, machining or drilling techniques. As with metering section 112, the technique(s) chosen is/are typically determined based on performance, reproducibility and cost. Diffusing section 114 can be formed in steps 204, 206, and 208 so that lobes diverge longitudinally and laterally from the metering section and the transition region extends between at least one of the lobes and the outlet.

Figure 13B:
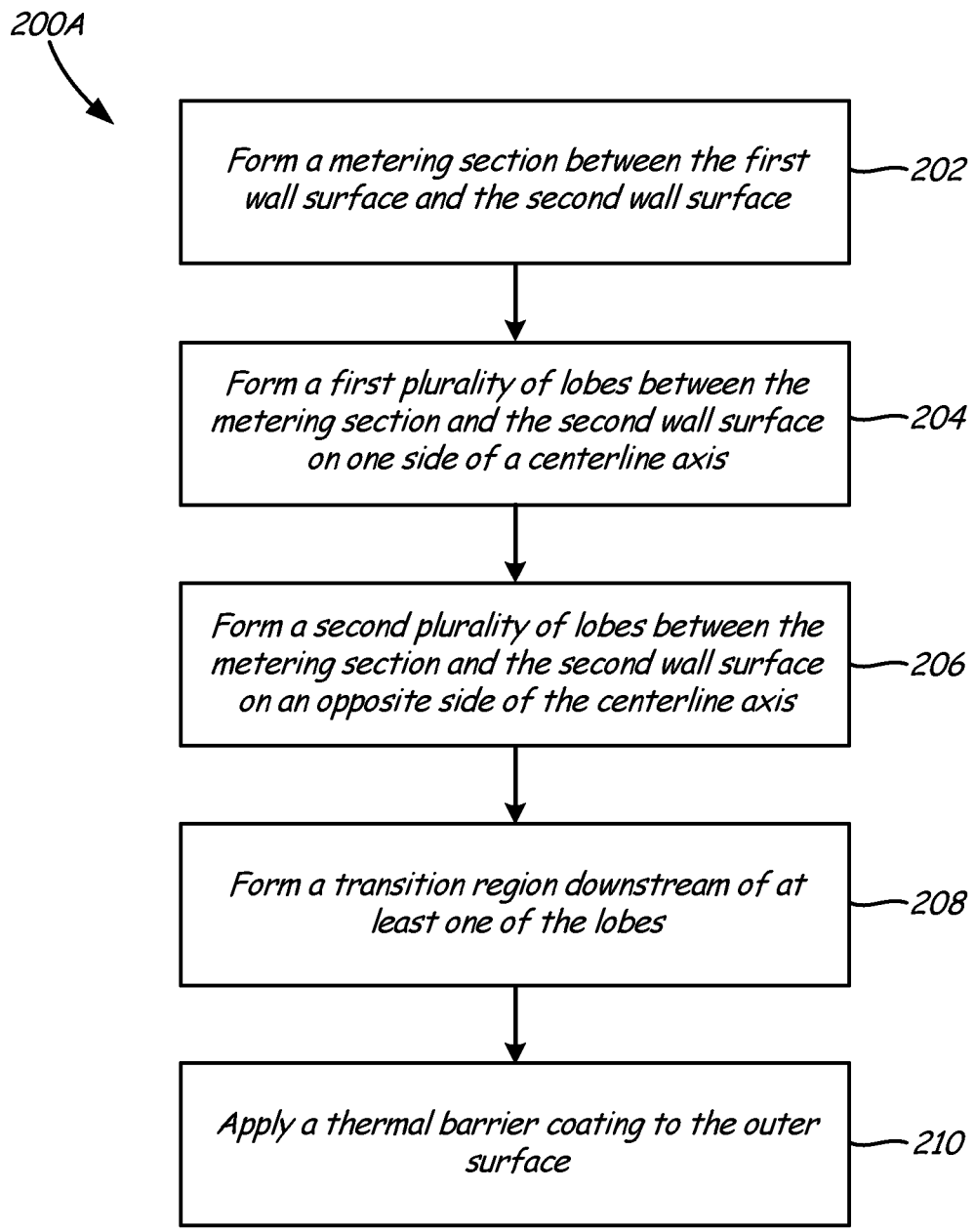
FIG. 13B is a simplified flow diagram illustrating another embodiment of a method for producing a multi-lobed cooling hole in a gas turbine engine wall.

In embodiments where step 202 occurs prior to steps 204, 206, and 208, outlet 116 is fully formed once steps 204, 206, and 208 have been completed. Method 200 can be performed before or after an optional thermal barrier coating application. In optional step 210 (shown as a step in method 200A in FIG. 13B), a thermal barrier coating is applied to outer wall surface 104. Application of the thermal barrier coating can also include the application of a bond coating prior to the thermal barrier coating. The steps of method 200A can be performed in any order depending on the location of cooling hole 106 and the location of diffusing section 114 relative to the metallic wall and the thermal barrier coating. The order of the steps can affect the machining or drilling techniques chosen.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

Discussion of Possible Embodiments

The following are non-exclusive descriptions of possible embodiments of the present invention.

A component for a gas turbine engine can include a wall and a cooling hole extending through the wall. The wall can have a first surface and a second surface. The cooling hole can include a metering section extending downstream from an inlet in the first surface of the wall and a diffusion section extending from the metering section to an outlet in the second surface of the wall. The diffusion section can include a first plurality of lobes diverging longitudinally and laterally from the metering section on a first side of a centerline axis of the cooling hole and a second plurality of lobes diverging longitudinally and laterally from the metering section on a second side of the centerline axis.

The component of the preceding paragraph can optionally include, additionally and/or alternatively any, one or more of the following features, configurations and/or additional components:

the first plurality of lobes can include first and second lobes, the second plurality of lobes can include third and fourth lobes, a first ridge can divide the first lobe from the second lobe, a second ridge can divide the second lobe from the third lobe, and a third ridge can divide the third lobe from the fourth lobe;

a fifth lobe can be included, and at least one of first, second, third, fourth, and fifth lobes can be laterally aligned with the metering section;

the first, second, and third ridges can terminate downstream of the metering section;

at least one of the first, second, and third ridges can extend to a height lower than the second surface;

at least one of the first, second, and third ridges can extend to a height substantially equal to that of the second surface;

each of the first and second plurality of lobes can include a curved bottom portion;

each of the first and second plurality of lobes can include a trailing edge;

the trailing edges of the first and second plurality of lobes can terminate upstream of the outlet;

the trailing edges of the first and second plurality of lobes can terminate at the outlet;

a transition region can have an end adjacent the outlet and a portion that extends between the lobes and the outlet;

the portion of the transition region that extends between the lobes and the outlet can be longitudinally convex;

a center lobe can be positioned between the first plurality of lobes and the second plurality of lobes;

the first plurality of lobes can include first, second, and third lobes and the second plurality of lobes can include fourth, fifth, and sixth lobes.

the first plurality of lobes can consist of first and second lobes and the second plurality of lobes can consist of third and fourth lobes.

A wall of a component for a gas turbine engine can include first and second wall surfaces, an inlet located at the first wall surface, an outlet located at the second wall surface, a metering section commencing at the inlet and extending downstream from the inlet, and a diffusing section extending from the metering section to the outlet. The diffusing section can include a first plurality of lobes diverging longitudinally and laterally from the metering section on a first side of a centerline axis of the cooling hole and a second plurality of lobes diverging longitudinally and laterally from the metering section on a second side of the centerline axis.

The wall of the preceding paragraph can optionally include, additionally and/or alternatively any, one or more of the following features, configurations and/or additional components:

a transition region can have an end adjacent the outlet and a portion that extends between the lobes and the outlet;

the first plurality of lobes can include first and second lobes, the second plurality of lobes can include third and fourth lobes, a first ridge can divide the first lobe from the second lobe, a second ridge can divide the second lobe from the third lobe, and a third ridge can divide the third lobe from the fourth lobe; and the first, second, and third ridges can terminate downstream of the metering section.

A method can produce a cooling hole in a gas turbine engine wall having first and second wall surfaces. The method can include forming a metering section between the first wall surface and the second wall surface, forming a first plurality of lobes between the metering section and the second wall surface on a first side of a centerline axis; and forming a second plurality of lobes between the metering section and the second wall surface on a second side of the centerline axis. The metering section can meter a flow of fluid through the cooling hole. The first and second plurality of lobes can diverge longitudinally and laterally from the metering section.

The method of the preceding paragraph can optionally include, additionally and/or alternatively any, one or more of the following features, configurations and/or additional steps:

forming a transition region downstream of each of the first and second plurality of lobes, such that the transition region extends between the first and second plurality of lobes and the outlet; and/or applying a thermal barrier coating on the gas turbine engine wall.

The invention claimed is:

1. A component for a gas turbine engine, the component comprising:
   a wall having a first surface and a second surface; and
   a cooling hole extending through the wall, the cooling hole comprising:
      a metering section extending downstream from an inlet in the first surface of the wall; and
      a diffusion section extending from the metering section to an outlet in the second surface of the wall, the diffusion section comprising;
         a first plurality of lobes diverging longitudinally and laterally from the metering section on a first side of a centerline axis of the cooling hole; and
         a second plurality of lobes diverging longitudinally and laterally from the metering section on a second side of the centerline axis; and
         a transition region having an end adjacent the outlet and a portion that extends between the first and second pluralities of lobes and the outlet, wherein the portion of the transition region that extends between the first and second pluralities of lobes and the outlet is longitudinally convex.

2. The component of claim 1, wherein the first plurality of lobes comprise a first lobe and a second lobe, wherein the second plurality of lobes comprise a third lobe and a fourth lobe, wherein a first ridge divides the first lobe from the second lobe, wherein a second ridge divides the second lobe from the third lobe, and wherein a third ridge divides the third lobe from the fourth lobe.

3. The component of claim 2, and further comprising:
   a fifth lobe, wherein at least one of the first, second, third, fourth, and fifth lobes is laterally aligned with the metering section.

4. The component of claim 2, wherein the first, second, and third ridges terminate downstream of the metering section.

5. The component of claim 2, wherein at least one of the first, second, and third ridges extends to a height lower than the second surface.

6. The component of claim 2, wherein at least one of the first, second, and third ridges extends to a height substantially equal to that of the second surface.

7. The component of claim 1, wherein at least one of the first and second plurality of lobes comprise a curved bottom portion.

8. The component of claim 1, wherein each of the first and second plurality of lobes comprise a trailing edge, and wherein the trailing edges of the first and second plurality of lobes terminate upstream of the outlet.

9. The component of claim 1, and further comprising:
   a center lobe positioned between the first plurality of lobes and the second plurality of lobes.

10. The component of claim 1, wherein the first plurality of lobes comprises a first lobe, a second lobe, and a third lobe and wherein the second plurality of lobes comprises a fourth lobe, a fifth lobe, and a sixth lobe.

11. The component of claim 1, wherein the first plurality of lobes consists of a first lobe and a second lobe and wherein the second plurality of lobes consists of a third lobe and a fourth lobe.

12. A wall of a component for a gas turbine engine, the wall comprising:
- first and second wall surfaces;
- an inlet located at the first wall surface;
- an outlet located at the second wall surface;
- a metering section commencing at the inlet and extending downstream from the inlet;
- a diffusing section extending from the metering section to the outlet, the diffusing section comprising:
  - a first plurality of lobes diverging longitudinally and laterally from the metering section on a first side of a centerline axis of the cooling hole; and
  - a second plurality of lobes diverging longitudinally and laterally from the metering section on a second side of the centerline axis; and
  - a transition region having an end adjacent the outlet and a portion that extends between the first and second pluralities of lobes and the outlet, wherein the portion of the transition region that extends between the first and second pluralities of lobes and the outlet is longitudinally convex.

13. The wall of claim 12, wherein the first plurality of lobes comprise first and second lobes, wherein the second plurality of lobes comprise third and fourth lobes, wherein a first ridge divides the first lobe from the second lobe, wherein a second ridge divides the second lobe from the third lobe, wherein a third ridge divides the third lobe from the fourth lobe, and wherein the first, second, and third ridges terminate downstream of the metering section.

14. A method for producing a cooling hole in a gas turbine engine wall having first and second wall surfaces, the method comprising:
- forming a metering section between the first wall surface and the second wall surface, wherein the metering section meters a flow of fluid through the cooling hole;
- forming a first plurality of lobes between the metering section and the second wall surface on a first side of a centerline axis, wherein the first plurality of lobes diverge longitudinally and laterally from the metering section; and
- forming a second plurality of lobes between the metering section and the second wall surface on a second side of the centerline axis, wherein the second plurality of lobes diverge longitudinally and laterally from the metering section; and
- forming a transition region between the first and second pluralities of lobes and the second wall surface, wherein the transition region is longitudinally convex.

15. The method of claim 14, and further comprising:
applying a thermal barrier coating on the gas turbine engine wall.

* * * * *